US010352527B2

(12) United States Patent
Uozu et al.

(10) Patent No.: US 10,352,527 B2
(45) Date of Patent: Jul. 16, 2019

(54) LUMINOUS APPARATUS

(71) Applicant: National University Corporation Hamamatsu University School of Medicine, Hamamatsu-shi, Shizuoka (JP)

(72) Inventors: Yoshihiro Uozu, Yokohama (JP); Takahiko Hariyama, Hamamatsu (JP); Mantaro Hironaka, Hamamatsu (JP)

(73) Assignee: NATIONAL UNIVERSITY CORPORATION HAMAMATSU UNIVERSITY SCHOOL OF MEDICINE, Shizuoka (JP)

( * ) Notice: Subject to any disclaimer, the term of this patent is extended or adjusted under 35 U.S.C. 154(b) by 70 days.

(21) Appl. No.: 14/858,525

(22) Filed: Sep. 18, 2015

(65) Prior Publication Data

US 2016/0010827 A1 Jan. 14, 2016

Related U.S. Application Data

(63) Continuation of application No. PCT/JP2014/057468, filed on Mar. 19, 2014.

(30) Foreign Application Priority Data

Mar. 19, 2013 (JP) .................. 2013-056248

(51) Int. Cl.
*F21V 3/04* (2018.01)
*A01M 29/08* (2011.01)
(Continued)

(52) U.S. Cl.
CPC ............. *F21V 3/049* (2013.01); *A01M 29/08* (2013.01); *A01M 29/10* (2013.01); *F21V 3/04* (2013.01); *G09F 13/22* (2013.01)

(58) Field of Classification Search
CPC ... F21V 3/04; F21V 3/049; F21V 9/10; G02B 6/0058; A01M 29/08; A01M 29/10
(Continued)

(56) References Cited

U.S. PATENT DOCUMENTS 7,178,963 B2 * 2/2007 Ueda ................. G02F 1/133606
362/561
7,661,835 B2 * 2/2010 Chou ................. G02F 1/133603
349/63
(Continued)

FOREIGN PATENT DOCUMENTS

JP 6-282241 A 10/1994
JP 2004-247156 A 9/2004
(Continued)

OTHER PUBLICATIONS

Lehrer, M. et al., "Visual edge detection in the honeybee and its chromatic properties," *Proc. R. Soc. Lond.*, 8238, 321-330, 1990.
(Continued)

*Primary Examiner* — Julie A Bannan
(74) *Attorney, Agent, or Firm* — Brinks Gilson & Lione

(57) ABSTRACT

Provided is a luminous, apparatus such as a display, having a function of preventing attraction of insects. A display apparatus 1 has a light emission surface 1 whose peripheral edge region is at least partially formed as a low-attraction region which is less capable of attracting bugs, wherein the low-attraction region is composed of an optical property gradient region whose at least one optical property gradually changes in a direction from an inward side to an outward side of the light emission surface.

7 Claims, 8 Drawing Sheets

(51) Int. Cl.
*G09F 13/22* (2006.01)
*A01M 29/10* (2011.01)

(58) Field of Classification Search
USPC .......................................................... 362/618
See application file for complete search history.

(56) References Cited

U.S. PATENT DOCUMENTS

| | | | |
|---|---|---|---|
| 2005/0111209 A1* | 5/2005 | Tanaka | G02B 6/0036 362/615 |
| 2006/0002107 A1* | 1/2006 | Jeong | G02F 1/133604 362/225 |
| 2006/0139952 A1* | 6/2006 | Inoue | G02F 1/133603 362/613 |
| 2006/0146228 A1* | 7/2006 | Sogo | C08L 69/00 349/65 |
| 2007/0091643 A1* | 4/2007 | Ogawa | G02F 1/133615 362/624 |
| 2007/0103908 A1* | 5/2007 | Tabito | G02F 1/133608 362/294 |
| 2008/0175023 A1* | 7/2008 | Lee | G02F 1/133615 362/613 |
| 2009/0237958 A1* | 9/2009 | Kim | F21S 8/026 362/617 |
| 2010/0182514 A1* | 7/2010 | Kuromizu | G02F 1/133604 348/725 |
| 2012/0275187 A1* | 11/2012 | Chang | G02B 6/0036 362/608 |
| 2013/0187548 A1* | 7/2013 | Childers | F21V 21/00 315/113 |
| 2014/0085924 A1* | 3/2014 | Li | G09F 13/18 362/606 |
| 2014/0223803 A1 | 8/2014 | Hariyama et al. | |
| 2015/0235598 A1* | 8/2015 | Liao | G09G 3/3426 362/606 |

FOREIGN PATENT DOCUMENTS

| | | |
|---|---|---|
| JP | 2007-317423 A | 12/2007 |
| JP | 2009-129689 A | 6/2009 |
| JP | 2010-118294 A | 5/2010 |
| JP | 2011-48726 A | 3/2011 |
| WO | WO 2013/042743 A1 | 3/2013 |

OTHER PUBLICATIONS

Osorio, D. et al., "What Causes Edge Fixation in Walking Flies?", *J. exp. Biol.*, 149, 281-292, 1990.

Varjü, D., "Stationary and dynamic responses during visual edge fixation by walking insects," *Nature*, vol. 255, pp. 330-332, May 22, 1975.

Varjü, D., "Visual Edge Fixation and Negative Phototaxis in the Mealworm Beetle *Tenebrio molitor*," *Biol. Cybernetics*, 25, 17-26, 1976.

Wehner, R., "Spontaneous Pattern Preferences of *Drosophila melanogaster* to Black Areas in Various Parts of the Visual Field," *J. Insect Physiol.*, vol. 18, pp. 1531-1543, 1972.

Zhou, Yanqiong et al., "Edge detection depends on achromatic channel in *Drosophila melanogaster*," *The Journal of Experimental Biology*, 215, pp. 3478-3487, 2012.

International Search Report, and English language translation thereof, in corresponding International Application No. PCT/JP2014/057468, dated Jun. 24, 2014, 5 pages.

* cited by examiner

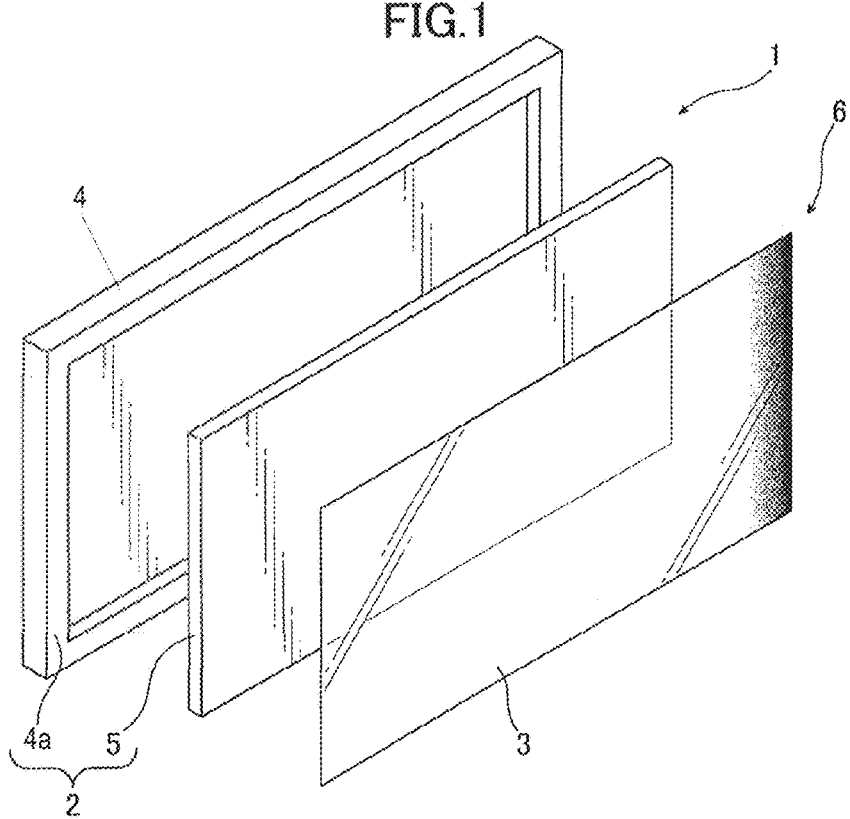
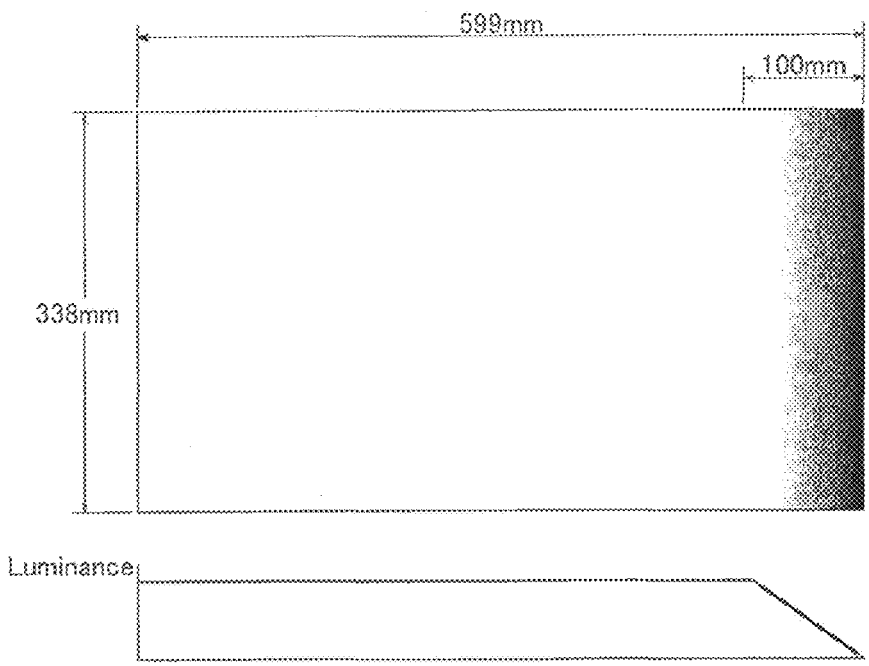

LUMINOUS APPARATUS

RELATED APPLICATIONS

This application is a continuation of International Application PCT/JP2014/057468, with an international filing date of Mar. 19, 2014, which claims priority under 35 U.S.C. § 119 to Japanese Patent Application No. 2013-056248 filed on Mar. 19, 2013, the entire contents of which are incorporated herein by reference.

BACKGROUND OF THE INVENTION

1. Field of the Invention

The present invention relates to a luminous apparatus, and more particularly to a luminous apparatus having a light emission surface whose peripheral edge region is at least partially formed as a low-attraction region which is less capable of attracting bugs.

2. Description of the Related Art

During nighttime, in a luminous apparatus such as a display for displaying advertisements of an automatic vending machine, or the like, insects such as stink bugs and moths gather while being attracted by light emitted from the luminous apparatus. Such a situation where insects gather around the luminous apparatus undesirably gives users a discomfort feeling. Therefore, for example, the following Patent Document 1 discloses an automatic vending machine comprising a built-in sound wave generator configured to generate an ultrasound wave.

Meanwhile, it is known that light of a specific wavelength exhibits an attracting property with respect to insects, and there has been known a lighting system configured to cut light of a specific wavelength having the attracting property to become less capable of attracting insects. For example, the following Patent Document 2 discloses a lighting system using an optical filter configured to cut 100% of light of a wavelength of up to about 395 nm, and adjust a transmittance with respect to light of a wavelength of about 405 nm and an average transmittance with respect to light of about 450 nm or more to become about 50% or less and about 50% or more, respectively, whereby the lighting system becomes less capable of attracting insects.

CITATION LIST

Patent Document

Patent Document 1: JP 2011-048726A
Patent Document 2: JP 2004-247156A

SUMMARY OF THE INVENTION

Technical Problem

However, in the invention described in the cited Document 1, it is necessary to newly incorporate the sound wave generator in the automatic vending machine. Therefore, there is a need to allow a luminous apparatus itself to have a function of preventing attraction of insects, without specially incorporating any additional device.

In the invention described in the cited Document 2, light in the ultraviolet region and light on a short wavelength side of the visible region each regarded as having an insect attracting effect are cut to allow the lighting system to become less capable of attracting insects. However, in this case, light on the short wavelength side of the visible region is cut even slightly, causing a problem of change in hue of illumination, such as a problem that illumination light takes on a yellow tinge.

The present invention has been made in view of the above problems, and an object of thereof is to provide a luminous apparatus such as a display, capable of exhibiting an insect attraction preventing function, while suppressing a change in light color.

Solution to Technical Problem

The inventors of this application proposed an attraction device utilizing a phenomenon that, in a luminous apparatus comprising a first light source configured to emit light in a first wavelength region, and a second light source configured to emit light in a second wavelength region different from the first wavelength region, insects such as stink bugs are attracted to a boundary region between the first light source and the second light source (e.g., see International Application No. PCT/JP 2012/074100).

The above attraction device utilizes a fact that a visual information processing ability of an insect is different in each of the respective wavelength regions of light emitted from the first and second light sources. Further, the inventors of this application found that, when insects are attracted by light, they are attracted to contrast in wavelength (edge) of light emitted from a light source. In single light, the term "edge of light" means a boundary between a luminous area and a non-luminous area around the luminous area. On the other hand, in two or more different types of light, the term "edge of light" means a boundary between respective ones of the different types of light. That is, insects are not attracted simply by light or a specific wavelength, but attracted to the edge of light.

As a result of diligent studies, the inventors of this application further found that the insect attracting effect varies when a contrast change in the edge is moderated, for example, by adjusting luminance, and have experimentally discovered that this finding can be utilized to keep insects from approaching a display. Specifically, they have discovered that, when a peripheral edge region of a light emission surface of a luminous apparatus is formed as a luminance attenuation region whose luminance gradually decreases in a direction from an inward side to an outward side thereof, attraction of insects to the luminance attenuation region can be reduced.

In view of the above discovery, a luminous apparatus of the present invention is characterized in that it has a light emission surface whose peripheral edge region is at least partially formed as a low-attraction region which is less capable of attracting bugs, wherein the low-attraction region is composed of an optical property gradient region whose at least one optical property gradually changes in a direction from an inward side to an outward side of the light emission surface. Examples of the optical property include, but are not limited to, luminance as a whole, a wavelength property, a luminance at a specific wavelength, particularly, in the ultraviolet wavelength range, and a type of polarization.

In the present invention, the low-attraction region is preferably provided along at least one side of the light emission surface, wherein the light emission surface has a rectangular surface.

In one embodiment of the present invention, the low-attraction region is composed of a luminance attenuation region whose luminance gradually decreases in the direction from the inward side to the outward side of the light emission surface.

In the present invention having the above feature, the luminance attenuation region whose luminance gradually decreases in the direction from the inward side to the outward side is provided, so that it becomes possible to suppress attraction of insects.

Preferably, in the present invention, the luminance attenuation region has a width of 100 mm or more.

More preferably, the width of the luminance attenuation region is 200 mm or more.

In the present invention having the above features, when the width of the luminance attenuation region is 100 mm or more, the luminance attenuation region is less capable of attracting insects, and, when the width of the luminance attenuation region is 200 mm or more, the luminance attenuation region is much less capable of attracting insects. Thus, it becomes possible to more reliably suppress the attenuation of insects.

Preferably, in the present invention, a light transmissive sheet is laminated to the light emission surface, wherein the luminance attenuation region is formed in such a manner that a portion of the light transmissive sheet corresponding to the luminance attenuation region is formed as a light transmissibility lowering portion whose light transmissibility gradually degreases in the direction from the inward side to the outward side.

In the present invention having the above feature, the present invention can be easily applied even to an existing luminous apparatus by laminating the light transmissive sheet thereto.

Preferably, in the present invention, the light emission surface is defined by a plurality of light sources, wherein the luminance attenuation region is formed by arranging the plurality of light sources in such a manner that a density thereof gradually decreases in the direction from the inward side to the outward side.

Effect of Invention

The present invention can provide a luminous apparatus such as a display, capable of exhibiting an insect attraction preventing function, while suppressing a change in light color.

BRIEF DESCRIPTION OF THE DRAWINGS

FIG. 1 is an exploded perspective view illustrating a structure of a display unit according to one embodiment of the present invention.

FIG. 2 is a diagram illustrating a luminance distribution in Example 1.

DETAILED DESCRIPTION OF THE PREFERRED EMBODIMENTS

Figure 3:
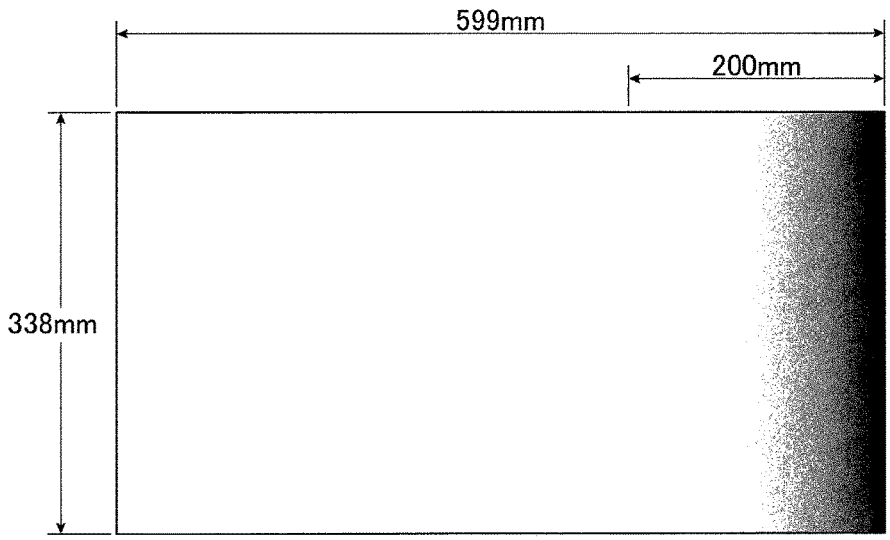
FIG. 3 is a diagram illustrating a luminance distribution in Example 2.

With reference to the drawings, one embodiment of a luminous apparatus of the present invention will now be described. This embodiment will be described based on an example where a display apparatus is used as the luminous apparatus.

FIG. 1 is an exploded perspective view illustrating a structure of a display apparatus according to this embodiment. As illustrated in FIG. 1, the display apparatus 1 according to this embodiment comprises a display body 2, and a light transmissive sheet 3 laminated to a front surface of the display body 2. The display body 2 comprises: a housing 4 having a frame 4a in the front thereof and internally provided with an illuminant (not illustrated) such as LED; and a light transmissive plate 5 made of milky-white resin or glass having a scattering property and attached to a front surface of the housing 4, wherein light generated from the illuminant is transmitted through the light transmissive plate 5 and emitted forward of the display body 2. Thus, this resin plate 5 defines a light emission surface of the display body 2. The illuminant in the display body 2 is configured to generate light in such a manner as to allow light emitted from the light emission surface to have a substantially uniform luminance regardless of a position of the light emission surface.

For example, as the display body 2, it is possible to use one of various types of well-known display devices, such as an LED display, a liquid crystal display, a plasma display, and an organic EL display. The display body 2 is capable of displaying characters, graphics or the like on the light emission surface by electrically controlling the illuminant. The light emission surface is not necessarily capable of color display but may be capable of gray scale display.

The light transmissive sheet 3 is a sheet member having the same size and shape as those of the light emission surface of the display body 2 and exhibiting light transmissibility. The light transmissive sheet 3 is formed with a light transmissibility lowering portion 6 whose light transmissibility gradually decreases in a direction from an inward side to an outward side thereof, along one of opposite vertical sides thereof. This light transmissibility lowering portion 6 can be formed by printing dots over a given width along the one vertical side of the light transmissive sheet 3, in such a manner that a density of the dots continuously increases in the direction from the inward side to the outward side. Examples of a material for the light transmissive sheet 3 include polycarbonate-based resin, polystyrene-based resin, polyester-based resin, polyurethane-based resin, acrylic-based resin, polyether sulfone, polysulfone, polyether ketone, cellulose-based resin (triacetylcellulose, etc.), polyolefin, alicyclic polyolefin, and glass. The dots of the light transmissibility lowering portion 6 are formed such that the light transmissibility decreases in the direction from the inward side to the outward side at a constant rate, so that values of the light transmissibility at positions away from the one side by the same distance becomes equal to each other.

In the display apparatus 1 configured as above, light emitted from the light emission surface of the display body 2 is emitted through the light transmissive sheet 3. In this process, light passing through a portion of the light transmissive sheet 3 other than the light transmissibility lowering portion 6 is directly transmitted therethrough, whereas light passing through the light transmissibility lowering portion 6 is partially blocked by the dots forming the light transmissibility lowering portion 6, so that a luminance of the light is attenuated. In addition, the density of the dots printed in the light transmissibility lowering portion 6 of the light transmissive sheet 3 continuously increases in the direction from the inward side to the outward side. Thus, although a luminance of light emitted from the display apparatus 1 according to this embodiment is constant, except in a region of the light emission surface having a given width along one of opposite vertical sides thereof, corresponding to the light transmissibility lowering region 6, (this region will hereinafter be referred to as "luminance attenuation region"), the luminance continuously decreases in a direction from an inward side to an outward side of the light emission surface, in the luminance attenuation region.

In this embodiment, the luminance attenuation region can be formed by laminating the light transmissive sheet 3 to the light emission surface of the display body 2, so that it becomes possible to easily apply the present invention to any type of existing display device or the like.

Experiment 1

The inventors of this application carried out an experiment to ascertain that insects are not attracted to the luminance attenuation region of the light emission surface in the above display apparatus. This experiment will be described below.

Figure 4:
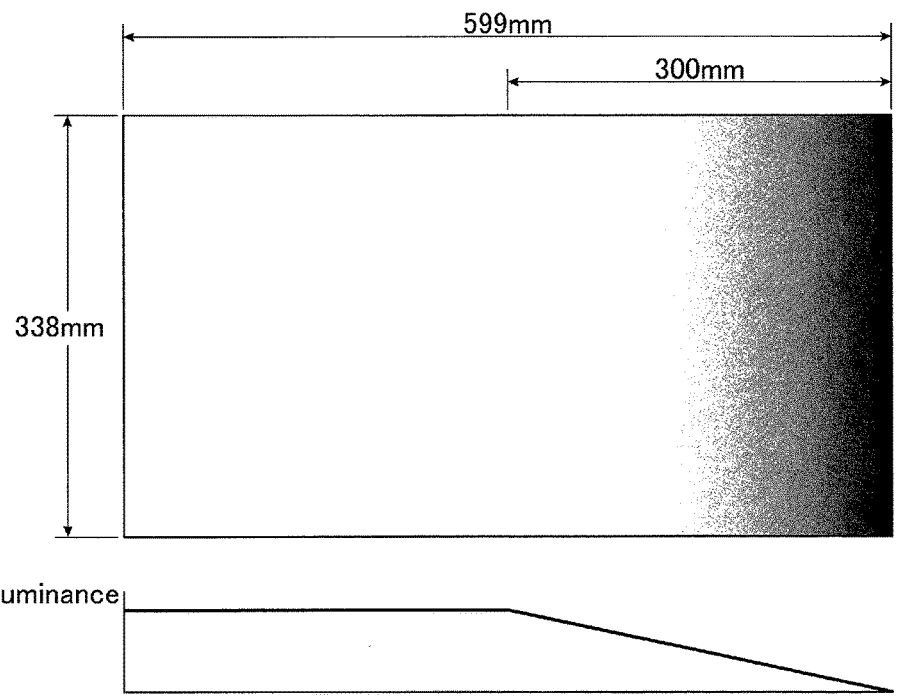
FIG. 4 is a diagram illustrating a luminance distribution in Example 3.

In this experiment, each of three types of display apparatuses in Examples 1 to 3 was placed in a dark room, and stink bugs (*Plautia crossota stali* Scott) were released in the dark room to measure stereotactic positions of the stink bugs, wherein each of the display apparatuses 1 was prepared by providing a luminance attenuation region having a different width at one end thereof. FIGS. 2 to 4 illustrate respective luminance distributions in Examples 1 to 3.

Example 1

A backlight of diamondcrysta WIDE RDT271WLMV (BK) produced by Mitsubishi Electric Corporation was used as the illuminant in the display body 2, and ACRYLITE #432 produced by Mitsubishi Rayon Co., Ltd., was used as the light transmissive plate 5 of the display body 2. The light emission surface had a length dimension of 599 mm and a width dimension of 338 mm.

A colorless and transparent polyethylene terephthalate (PET) sheet was used as the light transmissive sheet 3, and printed with dots using solvent-type ink to form a light transmissibility lowering portion 6 in a width of 100 mm as measured from one of opposite vertical side of the light transmissive sheet 3, as illustrated in FIG. 2. In the light transmissibility lowering portion 6 of the light transmissive sheet 3, a light transmissibility thereof was set to continuously decrease from 100% to 0%.

Example 2

The same display body 2 as that in Example 1 was used.
A colorless and transparent polyethylene terephthalate (PET) sheet was used as the light transmissive sheet 3, and printed with dots using solvent-type ink to form a light transmissibility lowering portion 6 in a width of 200 mm as measured from the one vertical side, as illustrated in FIG. 3.

In the light transmissibility lowering portion 6 of the light transmissive sheet 3, a light transmissibility thereof was set to continuously decrease from 100% to 0%.

Example 3

The same display body 2 as that in Example 1 was used.
A colorless and transparent polyethylene terephthalate (PET) sheet was used as the light transmissive sheet 3, and printed with dots using solvent-type ink to form a light transmissibility lowering portion 6 in a width of 300 mm as measured from the one vertical side, as illustrated in FIG. 4. In the light transmissibility lowering portion 6 of the light transmissive sheet 3, a light transmissibility thereof was set to continuously decrease from 100% to 0%.

With respect to each of Examples 1 to 3, the display apparatus in each of Examples 1 to 3 was placed in a dark room, and stink bugs (*Plautia crossota stali* Scott) were released in the dark room to check collision position of the stink bugs.

Figure 5:
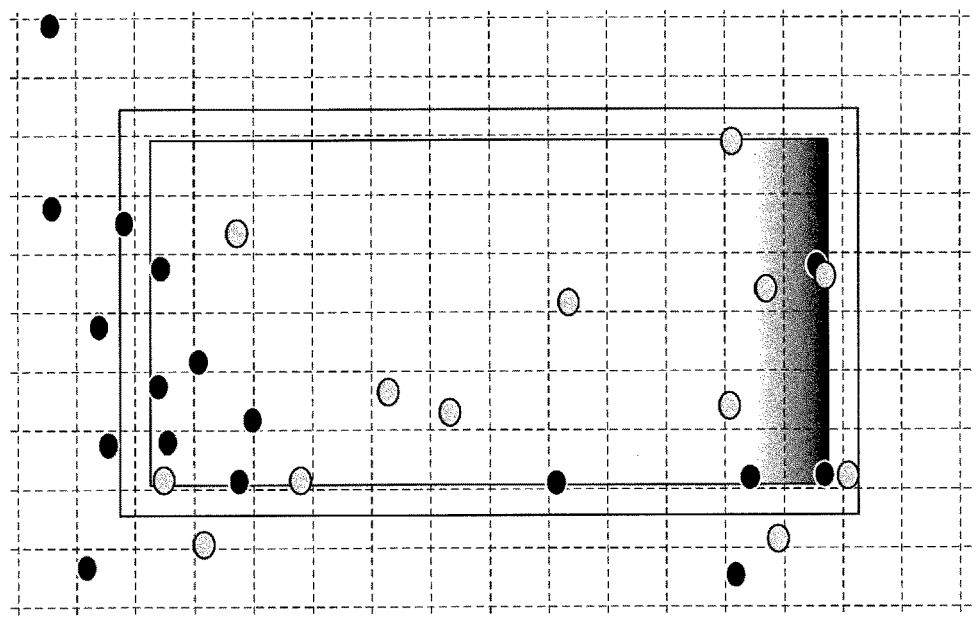
FIG. 5 is a diagram illustrating collision positions of stink bugs (*Plautia crossota stali* Scott) in Example 1.
Figure 6:
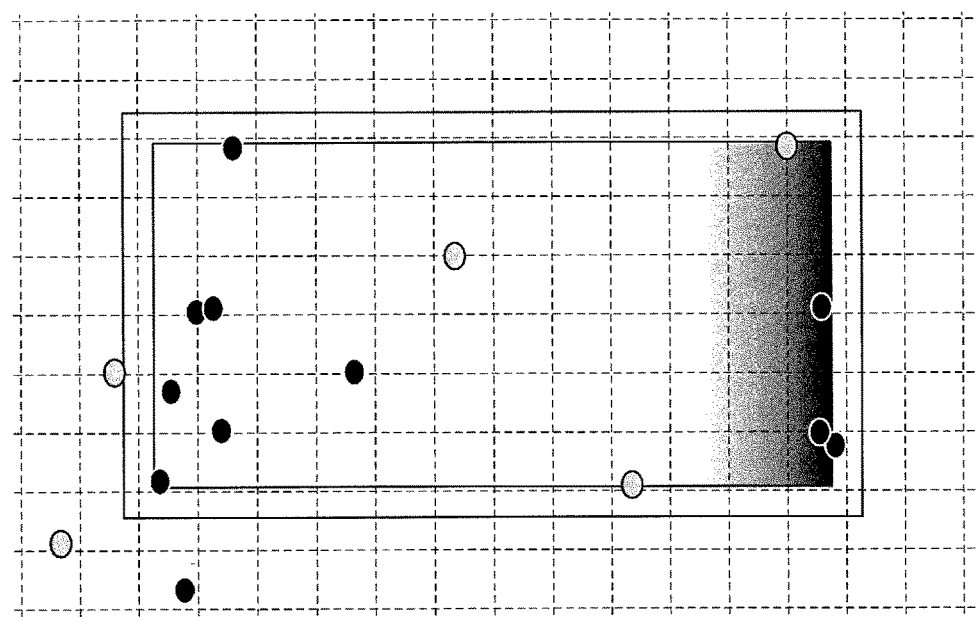
FIG. 6 is a diagram illustrating collision positions of stink bugs in Example 2.
Figure 7:
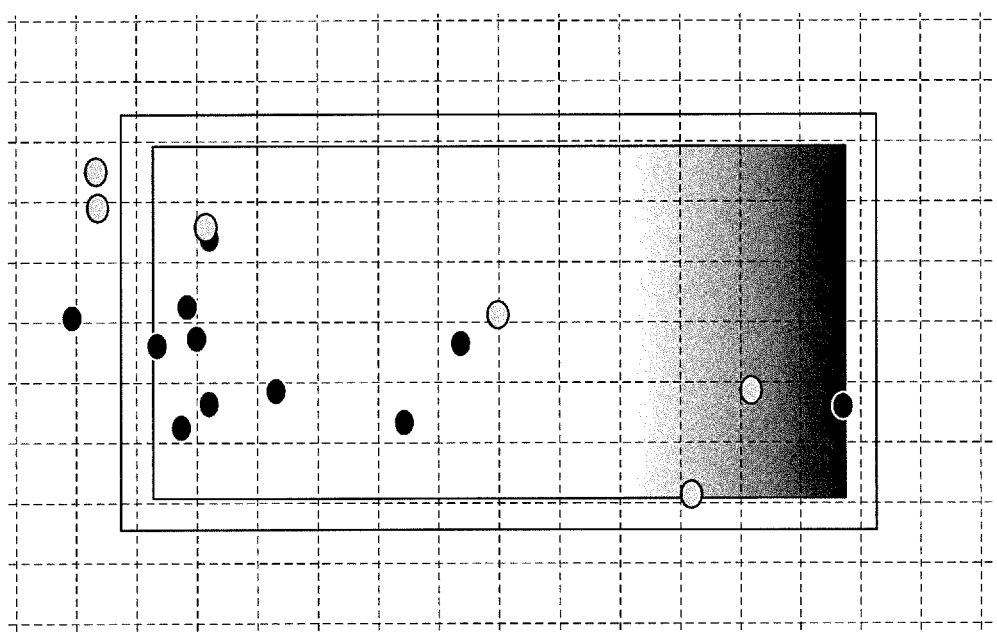
FIG. 7 is a diagram illustrating collision positions of stink bugs in Example 3.

FIGS. 5 to 7 illustrate collision position of the stink bugs in Examples 1 to 3, wherein the black circle indicates a collision position of a male stink bug, and the gray circle indicates a collision position of a female stink bug. A grid interval in FIGS. 5 to 7 is 5 cm.

As can be seen in FIGS. 5 to 7, in each of Examples 1 to 3, stink bugs frequently collided with the vertical sides, as compared to horizontal sizes.

As can be seen in FIG. 5, in Example 1, stink bugs most frequently collided with the vertical side provided with the luminance attenuation region and an area around the other vertical side, wherein a certain number of stink bugs also collided with an area around the vertical side provided with the luminance attenuation region.

On the other hand, as can be seen in FIGS. 6 and 7, in Examples 2 and 3, most stink bugs collided with the vertical side opposite to the side provided with the luminance attenuation region, wherein almost no stink bug collided with an area around the vertical side provided with the luminance attenuation region.

Through the above experiment, it was ascertained that a luminance attenuation region provided along one of opposite vertical sides in the display apparatus according to the above embodiment allows collision of insects with the one vertical side to become less likely to occur. That is, it was ascertained that, by forming a luminance attenuation region whose luminance gradually decreases in a direction from an inward side to an outward side of the light emission surface at a peripheral edge region of the light emission surface, it becomes possible to suppress attraction of insects to the peripheral edge region.

It was also ascertained that, in the case where the light emission surface is formed into a rectangular shape, stink bugs (insects) are more likely to be attracted to a vertical side thereof, and therefore the luminance attenuation region can be effectively provided along the vertical side.

Further, it was ascertained that when the width of the luminance attenuation region is set to 200 mm or more, the luminance attenuation region becomes much less capable of attracting bugs.

Experiment 2

Further, the inventors of this application carried out an experiment about whether or not, regarding a lighting system such as a ceiling lamp, bugs also stereotactically position in an edge of the lighting system. This experiment will be described below.

Figure 8:
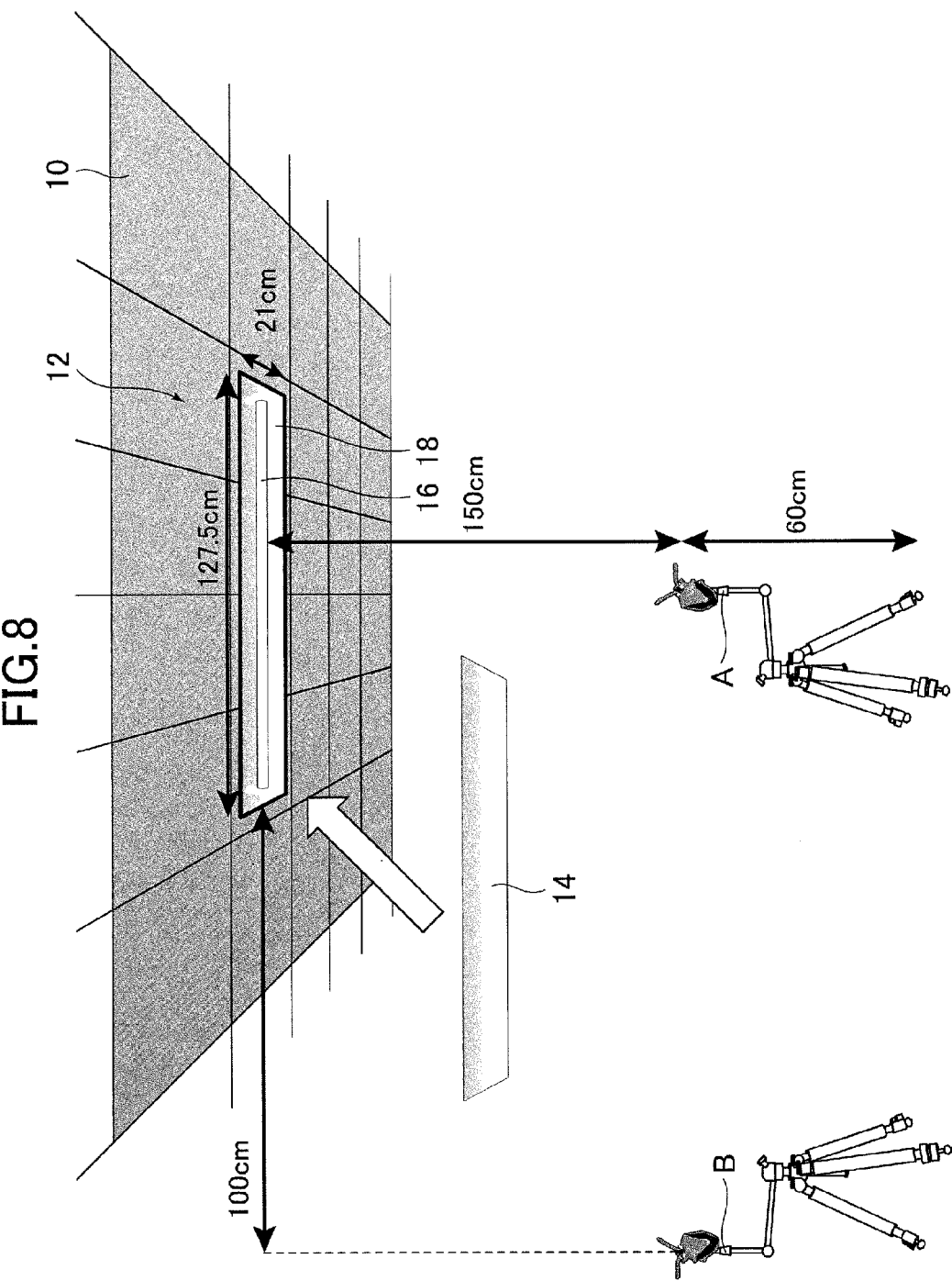
FIG. 8 is a diagram illustrating a state of an experiment about whether or not bugs stereotactically position in an edge of a ceiling lamp.

FIG. 8 is a diagram illustrating a state of the experiment about whether or not bugs stereotactically position in an edge of a ceiling lamp. As illustrated in FIG. 8, in this experiment, in two cases: one case where a diffuser plate is provided in a ceiling lamp 12 attached to a ceiling 10; and the other case where no diffuser plate is provided therein, stink bugs (*Plautia crossota stali* Scott) were allowed to fly from a flight table A or a flight table B, and stereotactic positions of the stink bugs were recorded. As the ceiling lamp 12, a lamp comprising a light source composed of a Hf fluorescent lamp 16 (FHF 32EX-N-H produced by Panasonic Corporation) and a shade 18 having a length of 1275 mm and a width of 210 mm was used. A height of the ceiling 10 from a floor was 2100 mm. The flight table A was provided at a height of 600 mm from a position of the floor just below the fluorescent lamp, and the flight table B was provided at a height of 600 mm from a position of the floor just below a position on an extension line of the fluorescent lamp and away from one end of the fluorescent lamp by 1000 mm.

Figure 9:
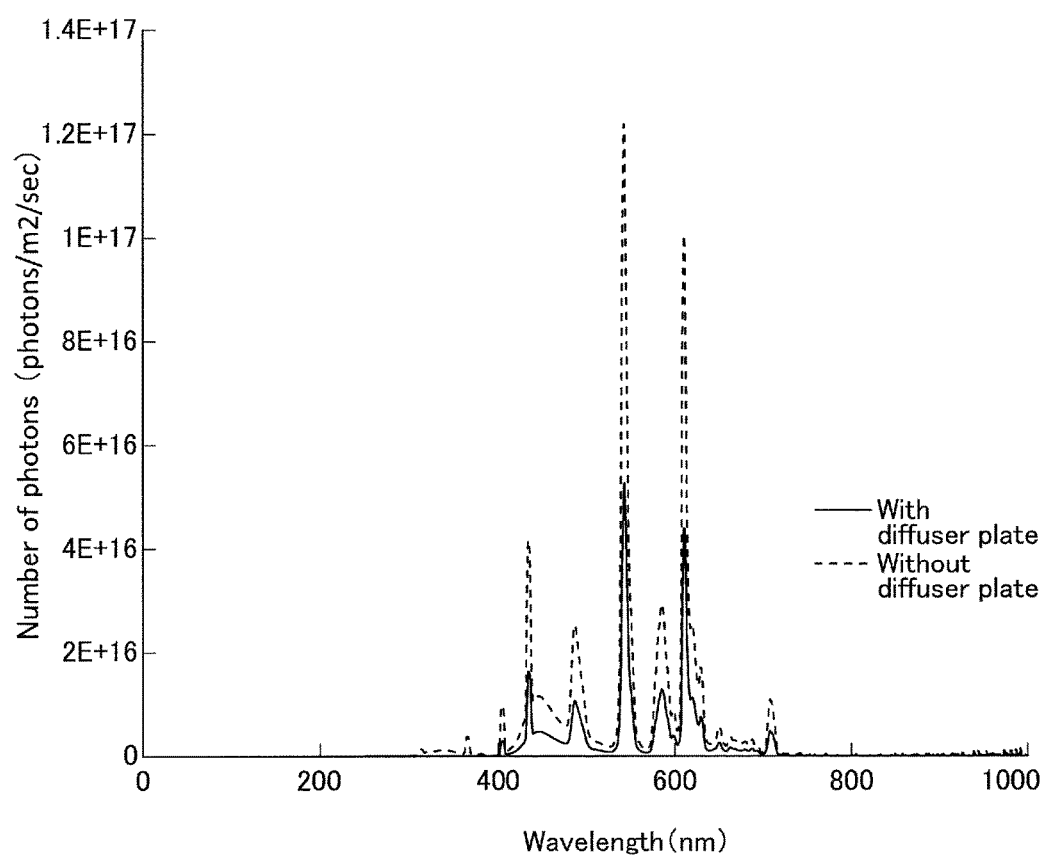
FIG. 9 is a graph presenting a relationship between a wavelength and the number of photons in two cases: one case where a diffuser plate is provided; and the other case where no diffuser plate is provided.

The diffuser plate 14 was composed of a semi-transparent plastic plate (FSK42355A produced by Panasonic Corporation) made of an acrylic resin (PMMA) having a length of 1235 mm, a width of 200 mm and a thickness of 2 mm. In a state after attaching the diffuser plate 14, the ceiling lamp 12 is regarded as a surface light source, and an outline of the fluorescent lamp 16 becomes visually unrecognizable. FIG. 9 is a graph presenting a relationship between a wavelength and the number of photons in two cases: one case where the diffuser plate 14 is provided; and the other case where the diffuser plate 14 is not provided. As can be seen in FIG. 9, even in the case where the diffuser plate 14 is provided, there is no change in tendency of wavelength components of light emitted from the ceiling lamp 12.

The experiment was carried out by setting experimental conditions to the following Conditions 1 to 3.

<Condition 1> Condition that stink bugs are allowed to fly from the flight table A in a state in which the diffuser plate 14 is attached.

<Condition 2> Condition that stink bugs are allowed to fly from the flight table A in a state in which the diffuser plate 14 is not attached.

<Condition 3> Condition that stink bugs are allowed to fly from the flight table B in the state in which the diffuser plate 14 is not attached.

Figure 10:
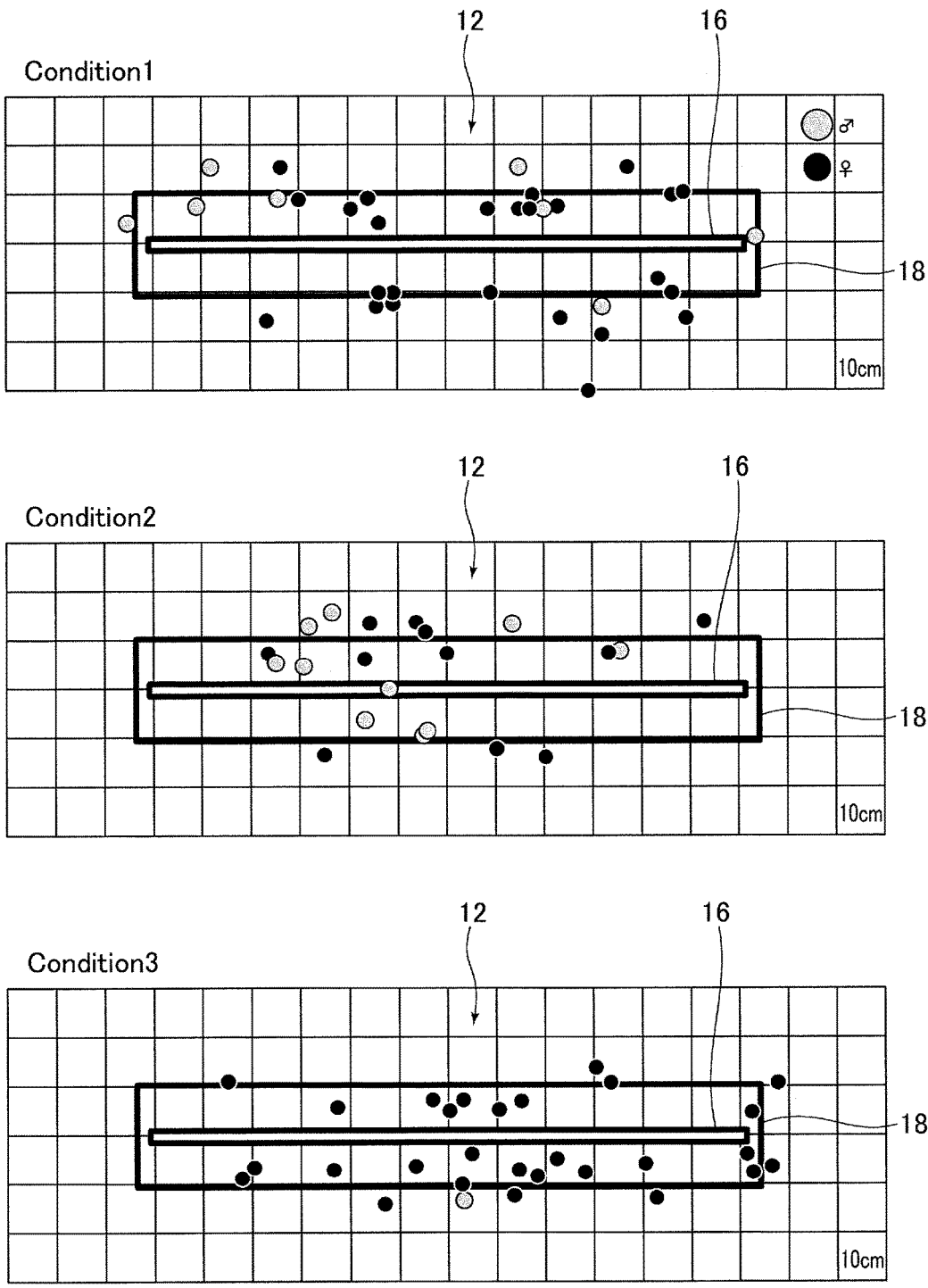
FIG. 10 is diagrams illustrating stereotactic positions of stink bugs under Conditions 1 to 3 in Experiment 2.

FIG. 10 diagrams illustrating stereotactic positions of stink bugs under Conditions 1 to 3. In two rectangles illustrated in FIG. 10, the outer rectangle indicates a boundary between the shade 18 of the ceiling lamp and the ceiling, and the inner rectangle indicates the outline of the fluorescent lamp 16. Further, in FIG. 10, the light-gray circle indicates a stereotactic position of a male stink bug, and the dark-gray circle indicates a stereotactic position of a female stink bug. In FIG. 10, grids spaced at intervals of 10 cm are superposed on the stereotactic positions.

As can be seen from the stereotactic positions under Conditions 1 to 3 illustrated in FIG. 10, flied stink bugs tend to stereotactically position around the boundary between the ceiling lamp and the ceiling, irrespective of the position of the fright table and the presence or absence of the diffuser plate.

Further, as can be seen from comparison between Condition 1 and each of Conditions 2 and 3, in Condition 1, a part of the stereotactic positions of stink bugs are largely spaced apart from the boundary between the ceiling lamp 12 and the ceiling, whereas, in each of Conditions 2 and 3, a much more number of stereotactic positions of stink bugs are largely spaced apart from the boundary between the ceiling lamp 12 and the ceiling. Thus, it can be ascertained that the diffuser plate 14 attached to the lighting system increases a tendency of insects to stereotactically position in the edge of the lighting systems.

As above, through this experiment, it was ascertained that, regarding an lighting system, insects also tend to stereotactically position in the edge of the lighting system. Further, through this experiment, it was ascertained that the diffuser plate provided to cover the lighting system increases a tendency of insects to stereotactically position in the edge of the lighting system. Thus, the present invention is particularly effective in a situation where a diffuser plate is provided to cover a lighting system.

Experiment 3

The inventors of this application experimentally ascertained that an insect attraction suppressing effect can be obtained by providing a luminance gradation (luminance attenuation region) in a peripheral edge region of a lighting system. This experiment will be described below.

In this experiment, a lighting system obtained by attaching a light transmissive sheet to a surface light source in the same manner as that in the aforementioned Example 1, wherein the light transmissive sheet is prepared by forming a luminance attenuation region along all of four sides of a rectangular-shaped transparent film in such a manner that a luminance of light transmitted therethrough gradually decreases in a direction perpendicular to each of the sides, from an inward side to an outward side of the transparent film (this lighting system will hereinafter be referred to as "Example 4"), and a lighting system comprising a surface light source having the same luminance and light intensity as those of Example 4 without the light transmissive sheet (this lighting system will hereinafter be referred to as "Comparative Example 4"), were arranged side-by-side in a room, and it was checked to which of the lighting system stink bugs (*Plautia crossota stali* Scott) are attracted.

In the lighting system of Example 4, the 599 mm-length and 338 mm-width backlight of diamondcrysta WIDE RDT271WLMV(BK) produced by Mitsubishi Electric Corporation, used as the illuminant in Example 1, was also used, and the luminance attenuation region was provided along the four sides in a width of 100 mm. In Comparative Example 4, the light source had a length of 457 mm and a width of 196 mm.

Figure 11:
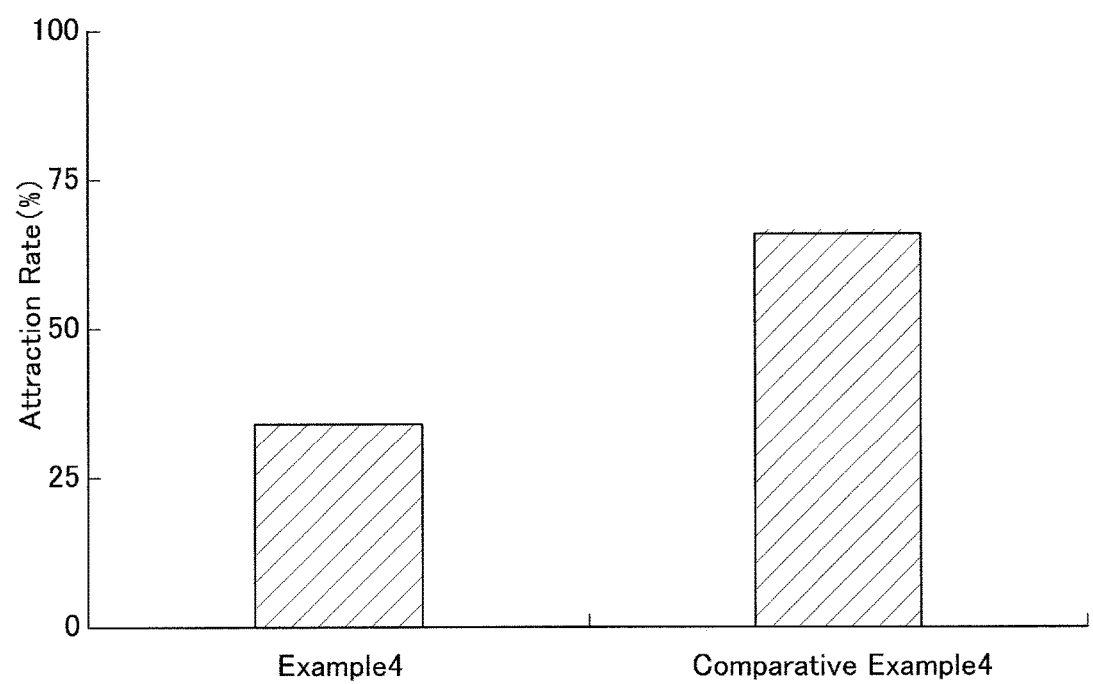
FIG. 11 is a graph presenting a result of Experiment 3.

FIG. 11 is a graph presenting a result of Experiment 3. As presented in FIG. 11, 65.9% of stink bugs were attracted to Comparative Example 4, whereas 34.1% of stink bugs were attracted to Example 4. Through this experiment, it was also ascertained that attraction of insects to illumination is prevented by providing a luminance graduation in a peripheral edge region of a lighting system.

In the above Example, a luminance graduation is provided in a peripheral edge region of a lighting system. Alternatively, a graduation of any other suitable optical property (optical property gradient region) may be provided. Examples of such an optical property include, but are not particularly limited to, a wavelength property, a luminance at a specific wavelength, particularly, in the ultraviolet wavelength range, and a type of polarization, in addition to a luminance at all wavelengths in the above Examples.

It should be noted that, although the above embodiment has been described based on an example where the present invention is applied to a display apparatus, the present invention is not limited thereto, but may also be applied, for example, to a lighting system having a planar light emission section. For example, the present invention can be applied to a lighting system or an advertising display in which an array of LED light sources are arranged behind a plate made of a semi-transparent resin.

In the above embodiment, the luminance attenuation region is formed by laminating, to the display body, a sheet member printed with dots in a portion thereof corresponding to the luminance attenuation region in such a manner that a density of the dots gradually increases in the direction from the inward side to the outward side. However, a technique of forming the luminance attenuation region is not limited thereto.

For example, in the case where a display apparatus comprises a plurality of light sources such as LED displays, the luminance attenuation region is formed by arranging the light sources (LEDs) in such a manner that a density thereof gradually decreases in the direction from the inward side to the outward side. That is, the luminance attenuation region in the present invention may have any configuration as long as it can reduce a luminance of light transmitted therethrough in the direction from the inward side to the outward side.

In the above embodiment, the luminance attenuation region is provided along one of opposite vertical sides of the light emission surface of the display apparatus. Alternatively, the luminance attenuation region may be provided along each of the vertical sides, or may be provided along each of opposite horizontal sides, in addition to the vertical sides. The shape of the light emission surface of the display apparatus is not limited to a rectangular shape, but may be any other suitable shape such as a circular shape.

Although the above embodiment has been described based on an example where the light transmissibility in the light transmissibility lowering portion of the light transmissive sheet continuously decreases from 100% to 0%, the light transmissibility may not necessarily decrease to 0%.

What is claimed is:

1. A luminous apparatus comprising:
    a housing having a frame in a front of the housing;
    a light transmissive plate placed in the frame of the housing, the light transmissive plate defining a light emission surface a bound of which is delineated by a periphery of the frame of the housing, wherein the periphery of the frame of the housing consists of four straight lines forming a rectangle, and
    an illuminant in the housing, wherein the illuminant generates light in such a manner as to allow light emitted from the light emission surface to have a substantially uniform luminance regardless of a position of the light emission surface,
    wherein the light emission surface comprises a low-attraction region formed to be less attracting to bugs than other regions of the light emission surface and provided in an entire peripheral edge region of the light emission surface within the bound of the light emission surface,
    wherein the low-attraction region is comprised of at least one luminance attenuation region having a light transmissibility lowering effect in which an intensity of luminance coming out through the light emission surface gradually and continuously decreases in a direction from an inward side of the light emission surface to the bound of the light emission surface, and
    wherein the at least one luminance attenuation region is formed in a shape of a straight strip having one straight side running in alignment with one of the four straight lines of the periphery of the frame of the housing, wherein the straight strip has a constant width along its length measured from said one of the four straight lines of the periphery of the frame of the housing.

2. The luminous apparatus according to claim 1, wherein the light emission surface has a rectangular shape.

3. The luminous apparatus according to claim 1, wherein the straight strip has constant width of the luminance attenuation region is 100 mm or more measured from said one of the four straight lines of the periphery of the light emission surface.

4. The luminous apparatus according to claim 3, wherein the constant width of the luminance attenuation region is 200 mm or more.

5. The luminous apparatus according to claim 1, further comprising a light passing sheet laminated on the light emission surface, wherein the light passing sheet comprises a light transmissibility lowering portion therein configured to provide the luminance attenuation region with the light transmissibility lowering effect.

6. The luminous apparatus according to claim 1, wherein the intensity of luminance in the other regions of the light emission surface is uniform across the other regions.

7. The luminous apparatus according to claim 1, wherein the luminous apparatus is used as an illuminating apparatus.

* * * * *